United States Patent
Fullerton et al.

(10) Patent No.: US 9,043,615 B2
(45) Date of Patent: *May 26, 2015

(54) METHOD AND APPARATUS FOR A TRUST PROCESSOR

(71) Applicant: Intel Corporation, Santa Clara, CA (US)

(72) Inventors: Mark Fullerton, Austin, TX (US); Moinul Khan, Austin, TX (US); David Wheeler, Gilbert, AZ (US); John Brizek, Placerville, CA (US); Anitha Kona, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,249

(22) Filed: Mar. 4, 2014

(65) Prior Publication Data
US 2014/0189371 A1    Jul. 3, 2014

Related U.S. Application Data

(63) Continuation of application No. 12/357,245, filed on Jan. 21, 2009, now Pat. No. 8,751,818, and a continuation of application No. 10/815,461, filed on Mar. 31, 2004, now abandoned.

(51) Int. Cl.
*G06F 11/30* (2006.01)
*G06F 12/14* (2006.01)
(Continued)

(52) U.S. Cl.
CPC .......... *G06F 12/1408* (2013.01); *G06F 21/57* (2013.01); *G06F 21/72* (2013.01); *G06F 2221/2105* (2013.01)

(58) Field of Classification Search
USPC ..................................................... 713/193
See application file for complete search history.

(56) References Cited

U.S. PATENT DOCUMENTS 6,085,090 A    7/2000  Yee et al.
6,704,871 B1   3/2004  Kaplan et al.
(Continued)

FOREIGN PATENT DOCUMENTS

EP      0534419 A2      3/1993
WO      2005/060151 A2  6/2005
WO      2005/060151 A3  10/2005

OTHER PUBLICATIONS

Jones, R. W, "User Functions for the Generation and Distribution of Encipherment Keys", ICL Technical Journal 4 (2), (Nov. 1984), pp. 146-158.

(Continued)

*Primary Examiner* — Dant Shaifer Harriman
(74) *Attorney, Agent, or Firm* — Thomas R. Lane

(57) ABSTRACT

In an embodiment, an apparatus includes a cryptographic processor within a wireless device. The cryptographic processor includes at least one cryptographic unit. The cryptographic processor also includes a nonvolatile memory to store one or more microcode instructions, wherein at least one of the one or more microcode instructions is related to a sensitive operation. The cryptographic processor also includes a controller to control execution of the one or more microcode instructions by the at least one cryptographic unit, wherein the controller is to preclude execution of the sensitive operation if the apparatus is within an untrusted state.

11 Claims, 8 Drawing Sheets

(51) Int. Cl.
*G06F 21/57* (2013.01)
*G06F 21/72* (2013.01)

(56) References Cited

U.S. PATENT DOCUMENTS

| | | | |
|---|---|---|---|
| 7,058,818 B2 * | 6/2006 | Dariel | 713/189 |
| 7,269,736 B2 | 9/2007 | Howard et al. | |
| 7,454,169 B2 | 11/2008 | Soerensen et al. | |
| 7,493,652 B2 | 2/2009 | Aura | |
| 7,543,335 B2 * | 6/2009 | England et al. | 726/27 |
| 2003/0120944 A1 | 6/2003 | Kim et al. | |
| 2003/0233537 A1 | 12/2003 | Wohlgemuth et al. | |
| 2004/0009815 A1 | 1/2004 | Zotto et al. | |
| 2004/0039928 A1 | 2/2004 | Elbe et al. | |
| 2004/0098715 A1 | 5/2004 | Aghera et al. | |
| 2005/0132226 A1 | 6/2005 | Wheeler et al. | |
| 2005/0240782 A1 | 10/2005 | Hubert et al. | |

OTHER PUBLICATIONS

Jones, R. W, "User functions for the generation and distribution of encipherment keys", Proc. of the EUROCRYPT 84 workshop on Advances in cryptology: theory and application of cryptographic techniques, 1985, pp. 317-334.

* cited by examiner

METHOD AND APPARATUS FOR A TRUST PROCESSOR

RELATED APPLICATION

This application is a continuation of U.S. patent application Ser. No. 10/815,461, filed Mar. 31, 2004, which claims priority to U.S. Provisional Patent Application Ser. No. 60/528,890, entitled Trusted Mobile Platform Architecture, filed Dec. 11, 2003. These applications are hereby incorporated by reference.

This application is related to pending U.S. patent application Ser. No. 10/815,454, filed on Mar. 31, 2004, which is assigned to the assignee of the embodiments disclosed herein, Intel Corporation.

TECHNICAL FIELD

This invention relates generally to electronic data processing and more particularly, to a trusted mobile platform architecture.

BACKGROUND

Wireless mobile devices (such as cellular telephones, personal digital assistants (PDAs), etc.) are typically small in size, untethered and are therefore easy to lose. As easy as they are to lose, such devices are just as easy to steal. Because of the propensity to be stolen, these devices are susceptible to tampering. Moreover, the minimalist approach to building a low-power device often makes these embedded systems simplistic (in terms of operating system and hardware), which in turn makes them susceptible in the hands of a malicious user and/or application. Users are depending on these devices for more valuable uses. In particular, within such devices, users are storing confidential information, such as receipts, credit card numbers, addresses, telephone numbers, confidential documents, etc. Accordingly, these devices are increasingly become a prime target for thieves because of the ease with which they can be attacked. Thus, there are needs to ensure the integrity of the device, including the application and data stored therein.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a trusted mobile computing device 100 can be located in FIG. 1. However, reference numbers are the same for those elements that are the same across different Figures. In the drawings.

DETAILED DESCRIPTION

Methods, apparatus and systems for a trusted mobile platform architecture are described. In the following description, numerous specific details are set forth. However, it is understood that embodiments of the invention may be practiced without these specific details. In other instances, well-known circuits, structures and techniques have not been shown in detail in order not to obscure the understanding of this description.

This detailed description is divided into three sections. In the first section, a hardware architecture is presented. In the second section, trusted and cryptographic operations are described. In the third section, a system operating environment is described.

Hardware Architecture

Figure 1:
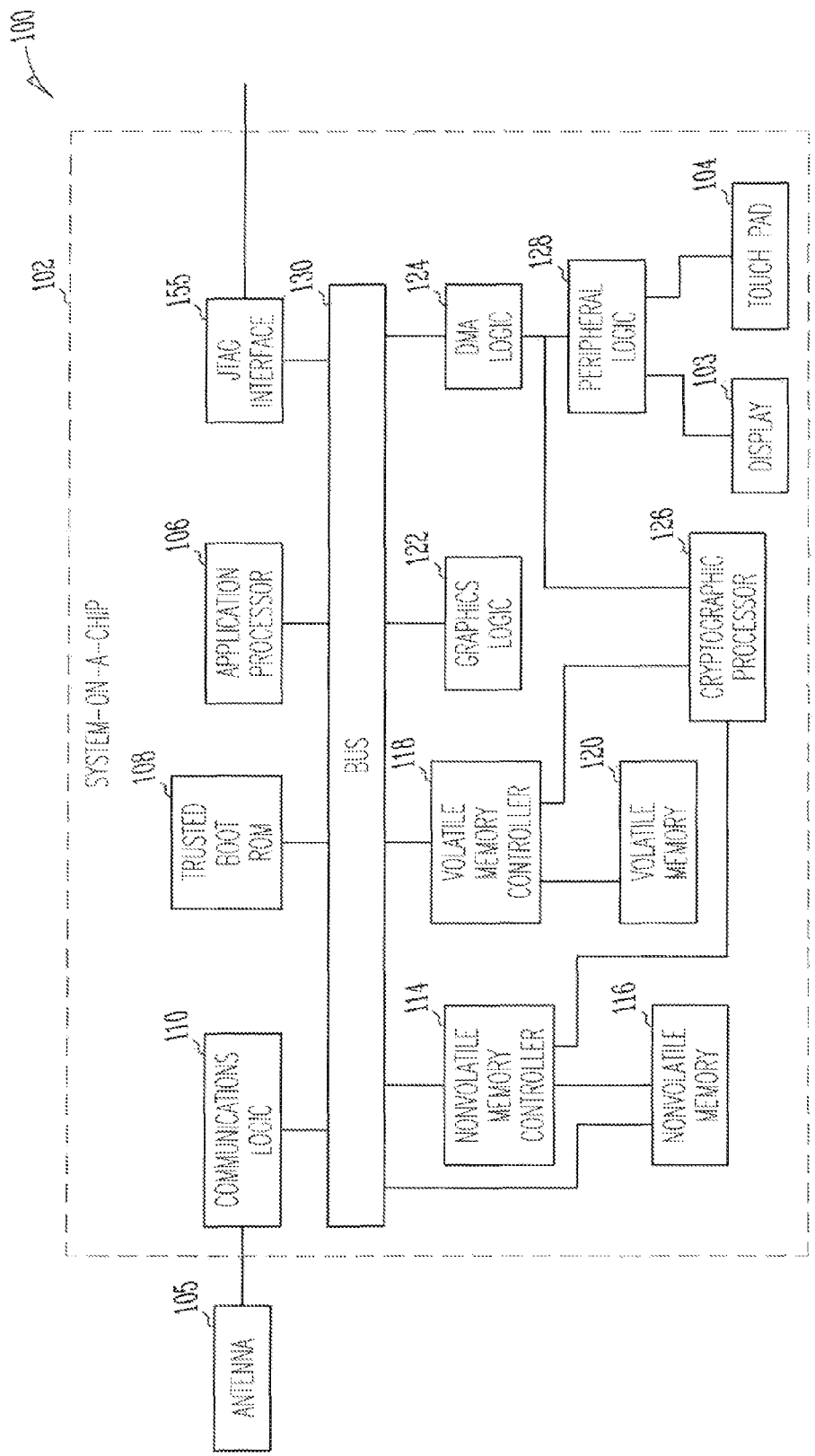
FIG. 1 illustrates a simplified functional block diagram of a mobile computing device having a trusted platform architecture, according to one embodiment of the invention.

FIG. 1 illustrates a simplified functional block diagram of a mobile computing device having a trusted platform architecture, according to one embodiment of the invention. In particular, FIG. 1 illustrates a trusted mobile computing device 100, which may be representative of a number of different types of mobile computing devices (such as a cellular telephone, a PDA, etc.). The trusted mobile computing device 100 includes a system-on-a-chip 102, a display 103, a touch pad 104 and an antenna 105, which are coupled together. The display may be a number of viewing devices, such as a Liquid Crystal Display (LCD) screen, etc. The touch pad 104 may be used to receive input from the user of the trusted mobile computing device 100. For example, the touch pad 104 may be a numeric touch pad, a keyboard, etc. Although not shown, the trusted mobile computing device 100 may include a number of other peripherals, such as audio Input/Output (I/O) logic, etc. for the input and output of audio data from the user.

The system-on-a-chip 102 may be a single chip wherein the components described herein are within, for example, a same semiconductor substrate. Alternatively, the system-on-a-chip 102 may be a number of such chips that are epoxied together.

The system-on-a-chip 102 includes an application processor 106, a trusted boot read only memory (ROM) 108, a communications logic 110, a controller 112, a nonvolatile memory controller 114, a nonvolatile memory 116, a volatile memory controller 118, a volatile memory 120, a graphics logic 122, a direct memory access (DMA) logic 124, a cryptographic processor 126, a peripheral logic 128, a Joint Test Access Group (JTAG) interface 155 and a bus 130. The application processor 106, the trusted boot ROM 108, the communications logic 110, the controller 112, the nonvolatile memory controller 114, the nonvolatile memory 116, the volatile memory controller 118, the graphics logic 122, the JTAG interface 155 and the DMA logic 124 are coupled to the bus 130. Accordingly, the bus 130 provides communications among such components. The display 103 and the touchpad 104 are coupled to the system-on-a-chip 102 through the peripheral logic 128.

The antenna 105 is coupled to the communications logic 110. The communications logic 110 provides for the receipt and transmission of I/O into and out from the trusted mobile computing device 100. For example, the communications logic 110 may receive and transmit wireless communications into and out from the trusted mobile computing device 100 using the antenna 105. The antenna 105 may be a patch, monopole, dipole, beam, array, or directional antenna, among others. As further described below, the antenna 105 may receive communications that cause the application processor 106 to generate one or more primitive instructions for a cryptographic operation. Such primitive instructions may be transmitted to the cryptographic processor 126 for execution. Additionally, the antenna 105 may output communications related cryptographic operations performed by the cryptographic processor 126.

In some embodiments, the communications logic 110 may include a baseband processor (a digital signal processor, for example) that establishes the particular communication standard for the trusted mobile computing device 100. The communications logic 110 may be a wireless interface. For example, if the trusted mobile computing device 100 is a cellular telephone, then the communications logic 110 provides a cellular network interface, a wireless interface, for the trusted mobile computing device 100. For this wireless interface, the baseband processor may establish a code division multiple access (CDMA) cellular radiotelephone communication system, or a wide-band CDMA (W-CDMA) radiotelephone communication system, as just a few examples. The W-CDMA specifically has been proposed as a solution to third generation ("3G") by the European Telecommunications Standards Institute (ETSI) as their proposal to the International Telecommunication Union (ITU) for International Mobile Telecommunications (IMT) 2000 for Future Public Land Mobile Telecommunications Systems (FPLMTS). The baseband processor may establish other telecommunication standards such as Global System for Mobile (GSM) Communication, ETSI, Version 5.0.0 (December 1995); or General Packet Radio Service (GPRS) (GSM 02.60, version 6.1), ETSI, 1997.

The trusted boot ROM 108 stores code that is executed by the application processor 106 prior to transferring control to an operating system to be executed in the application processor 106. As further described below, such code causes the execution of a number of trust operations (using the cryptographic processor 126) to ensure the integrity of the operating system. A more detailed description of the trusted boot operations is described in the following co-pending, commonly assigned U.S. patent application entitled "Securing an Electronic Device", Ser. No. 10/745,469 filed on Dec. 22, 2003. The JTAG interface 155 provides a debugging interface into the trusted mobile computing device 100.

The nonvolatile memory 116 may be any of a number of different types of nonvolatile writable memories, such as a FLASH memory, etc. The volatile memory 120 may be any of a number of different types of volatile writeable memories, such as Random Access Memory (RAM) (e.g., Synchronous Dynamic RAM (SDRAM), DRAM, DDR-SDRAM, etc.), etc.

The nonvolatile memory controller 114 is coupled to the nonvolatile memory 116. The volatile memory controller 118 is coupled to the volatile memory 120. Accordingly, components coupled to the bus 130 may communicate with the nonvolatile memory 116 and the volatile memory 120 through the nonvolatile memory controller 114 and the volatile memory controller 118, respectively. The cryptographic processor 126 and the peripheral logic 128 are coupled to the bus 130 through the DMA logic 124. Components coupled to the bus 130 may communicate with the cryptographic processor 126 and the peripheral logic 128 through the DMA logic 124.

The cryptographic processor 126 is also coupled directly, through private interfaces, to the nonvolatile memory 116 and the volatile memory 120 through the nonvolatile memory controller 114 and the volatile memory controller 118, respectively. As shown, other components in the trusted computing device 100 (such as the application processor 106) may not access the nonvolatile memory 116 and the volatile memory 120 through these private interfaces. Additionally, the cryptographic processor 126 and the application processor 106 may access the nonvolatile memory 116 and the volatile memory 120 through the bus 130 (public interfaces).

The cryptographic processor 126 may partition the volatile memory 120 into at least two different sections (a public section and a private section). Accordingly, only the cryptographic processor 126 may access the address space within the private section of the volatile memory 120. Additionally, the different components in the trusted mobile computing device 100 may access the address space within the public section of the volatile memory 120. Such a configuration allows the private section to be used for secure/trusted use and precludes the application processor 106 from accessing this section. Therefore, if a virus and/or malicious code were to be executing on the application processor 106, such code may not corrupt the private section of the volatile memory 120. Accordingly, the cryptographic processor 126 may use this private section for secure storage of encrypted cryptographic keys, etc. to be used in the operations performed therein.

As further described below, the cryptographic processor 126 comprises protected storage and a number of different functional units. The cryptographic processor 126 may provide for authentication of software, hardware, configuration data, etc. associated with or executing within the trusted mobile computing device 100. For example, as part of the initialization of the trusted mobile computing device 100, the cryptographic processor 126 may perform a cryptographic hash across the code of an application and compare this hash to a signed credential that is securely stored in the trusted mobile computing device 100. Additionally, the cryptographic processor 126 also provides for different cryptographic operations during operation of the trusted mobile computing device 100. For example, the cryptographic processor 126 may generate cryptographic keys, perform different types of encryption and decryption, generate hashes, digital signatures, etc.

The application processor 106 may be in a first operating context, while the cryptographic processor 126 may be in a second operating context. The first operating context and the second operating context may be independent of each other. As further described below, the application processor 106 may execute a driver (for the cryptographic processor 126) that provides the interface between applications executing on the application processor 106 and the cryptographic processor 126 (through the DMA logic 124). This driver receives requests for different security services (authentication, trust, encryption, decryption, etc.) from the operating system controlling the application processor 106. The driver may generate one or more primitive instructions based a security service request. These primitive instructions are then issued to the cryptographic processor 126 for execution. Moreover, the cryptographic processor 126 may retrieve data (from the nonvolatile memory 116 and/or the volatile memory 120 through the DMA logic 124) on which execution is performed based on the primitive instruction. The cryptographic processor 126 may execute a cryptographic operation on the retrieved data based on the primitive instruction.

A more detailed description of the operations of the trusted mobile computing device 100 are set forth below in conjunction with the flow diagrams in FIGS. 4, 5, 6A-6B.

Figure 2:
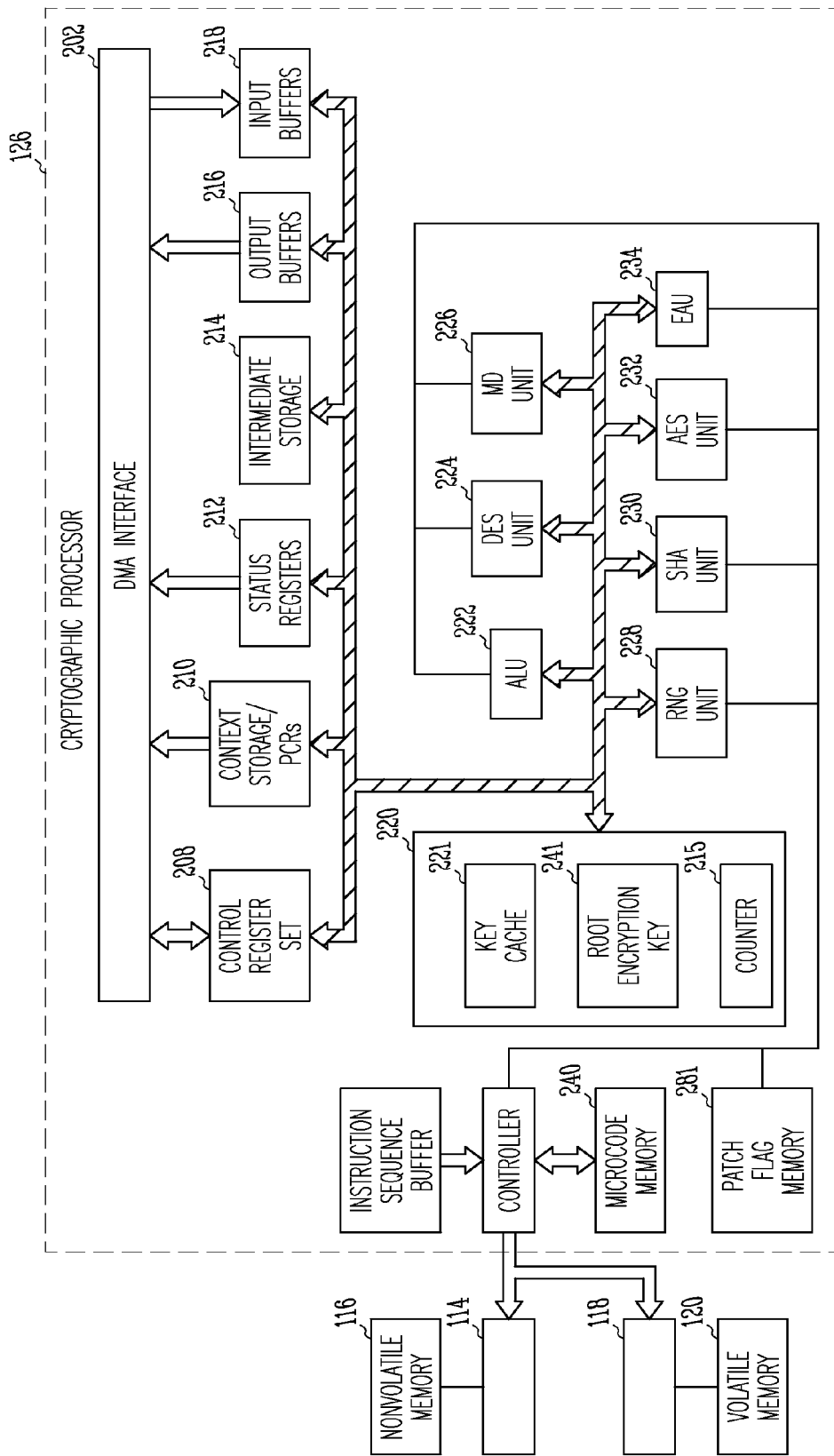
FIG. 2 illustrates a simplified functional block diagram of a cryptographic processor within a trusted mobile computing device, according to one embodiment of the invention.

FIG. 2 illustrates a simplified functional block diagram of a cryptographic processor within a trusted mobile computing device, according to one embodiment of the invention. In particular, FIG. 2 illustrates a more detailed block diagram of one embodiment of the cryptographic processor 126.

The cryptographic processor 126 includes a DMA interface 202, an instruction sequence buffer 204, a controller 206, a microcode memory 240, a patch flag memory 281, a control register set 208, context storage/platform configuration registers 210, status registers 212, intermediate storage 214, output buffers 216, input buffers 218, an internal volatile memory 220, an arithmetic logic unit (ALU) 222, a data encryption standard (DES) unit 224, a message digest (MD) unit 226, a random number generator (RNG) unit 228, a secure hash algorithm (SHA) unit 230, an advanced encryption standard (AES) unit 232 and an exponential arithmetic unit 234. Thus, the cryptographic processor 126 includes a number of different functional units (including a number of different cryptographic units) (the ALU 222, the DES unit 224, the MD unit 226, the RNG unit 228, the SHA unit 230, the AES unit 232 and the exponential arithmetic unit 234).

While the microcode memory 240 may be different types of memories, in one embodiment, the microcode memory 240 is a read only memory (ROM). The internal volatile memory 220 may be any of a number of different types of volatile writeable memories, such as Random Access Memory (RAM) (e.g., Synchronous Dynamic RAM (SDRAM), DRAM, DDR-SDRAM, etc.), etc. As shown, the internal volatile memory 220 stores a key cache 221, a root encryption key 241 and a counter 215. The key cache 221 may store a number of different protected keys, which may be data encryption keys and/or key encryption keys (used to encrypt data encryption keys). One embodiment of the key cache 221 is described in more detail below in conjunction with FIG. 3.

The patch flag memory 281 may be any of a number of different types of volatile writeable memories, such as Random Access Memory (RAM) (e.g., Synchronous Dynamic RAM (SDRAM), DRAM, DDR-SDRAM, etc.), etc. As further described below, the patch flag memory 281 may store patch flags that correspond to segments in the microcode memory 240. A given patch flag is indicative as to whether a given segment of the microcode memory 240 has been patched. A more detailed description of the use of the patch flags are described in more detail below.

The DMA interface 202 is coupled to receive and transmit data into and out from the cryptographic processor 126. The DMA interface 202 is coupled to the instruction sequence buffer 204, the control register set 208, the context storage/ PCRs 210, the status registers 212, the output buffers 216 and the input buffers 218.

The instruction sequence buffer 204 stores primitive instructions received from the application processor 106. The controller 206 may retrieve a given primitive instruction from the instruction sequence buffer 204 and retrieve the associated microcode instruction(s) from the microcode memory 240. These microcode instructions may include a series of operations to be performed within the cryptographic processor 126. For example, one instruction may cause the controller 206 to retrieve an encrypted data encryption key from the volatile memory 120. A different instruction may cause the controller 206 to transmit this key to one of the functional units for decryption. Another instruction may cause the decrypted data encryption key to be transmitted to a different functional unit to perform a cryptographic operation. The output from this series of microcode instructions may be stored into the output buffers 216. The driver (for the cryptographic processor 126) may then retrieve this output. A more detailed description of such operations is set forth below.

The SHA unit 230 may be used to generate and validate cryptographic hashes. The SHA unit 230 may perform SHA-1 operations, and HMAC calculations based on SHA. The exponential arithmetic unit 234 may be used to perform acceleration of a number of different arithmetic operations. For example, the exponential arithmetic unit 234 may be used to perform for asymmetric encryption and decryption, signing, verification of a signature, etc. for different types of encryption standards (such as the Rivest, Shaman and Adelman (RSA)). To illustrate, the exponential arithmetic unit 234 may perform modular exponentiation, modular reduction, multiplication, addition, subtraction, etc.

The AES unit 232 may perform a number of different types of encryptions (symmetric, asymmetric). The AES unit 232 may perform encryption based on a variable number of rounds that is dependent on the encryption key length. For example, AES unit 232 may support key lengths of 128-bit, 192-bit and 256-bit, that result in 10, 12 and 14 rounds, respectively. The AES unit 232 may be used to encrypt data encryption keys with a different key, termed a key encryption key.

Such an operation enables the secure storage of the data encryption keys in the key cache 221 of the volatile memory 220. The cryptographic processor 126 may be configured with a hierarchy of encryption keys. For example, the AES unit 232 may encrypt data encryption keys with key encryption keys. The AES unit 232 may encrypt the key encryption keys with the root encryption key 241. While in an encrypted form, the data encryption keys and the key encryption keys may be stored in a memory (such as the volatile memory 116, the nonvolatile memory 120) external to the cryptographic processor 126. To ensure security, the root encryption key 241 is not exposed externally to the cryptographic processor 126.

The DES unit 224 may perform a number of different types of encryption and decryption. For example, the DES unit 224 may encipher and decipher 64 bit blocks of data based on a 64-bit key. The MD unit 226 may generate hashes (message digests) based on a number of different standards. For example, the MD unit 226 may generates hashes based on MD-5, MD-4, etc. The MD unit 226 may receive a message block of arbitrary length and generate a 128-bit digest. The MD unit 226 may also perform Keyed-Hash Message Authentication Code (HMAC) operations.

The ALU 222 may perform a number of different arithmetic and logical operations for trust and encryption operations. For example, the ALU 222 may perform addition, subtraction, multiplication, division, bit alignments, shift operations, different logical functions (such as AND, OR, XOR, etc.), etc.

The RNG unit 228 may perform different types of random number generation. The RNG unit 228 may use a Linear Feedback Shift Register (LFSR) to generate a sequence of random bits. Additionally, the output of the LFSRs may be passed through the SHA unit 230 for additional randomness.

The control register set 208 may store data used to control the cryptographic processor 126. Accordingly, components external to the cryptographic processor 126 may store data into the control register set 208 related to control and configuration of the cryptographic processor 126. The context storage/PCRs 210 may store context and configuration data related to the trusted mobile computing device 100. For example, the context storage/PCRs 210 may store a cryptographic hash from a trust operation related to authentication of different applications executing on the application processor 106. The status registers 212 may be used to used to store status regarding given operations within the cryptographic processor 126, status of the different functional units, etc. The intermediate storage 214 may be used to store intermediate results that may be output from one functional unit that is to be inputted into a different functional unit.

The input buffers 218 may store data for which a given operation is performed. For example, if for a given primitive instruction a cryptographic hash is to be performed across the code of an application, the code is stored into the input buffers 218.

As shown, the cryptographic processor 126 includes a number of functional units (including a number of different cryptographic units) and different volatile storage. Additionally, the cryptographic processor 126 may perform a number of different operations, wherein the intermediate results are secure. As further described below, the controller 206 may control the operations of these different functional units and data flow there between.

As will be described, the cryptographic processor 126 allows for secure operations by providing atomicity and/or integrity of the operations therein. The atomicity of operations is defined such that an ongoing operation therein may not be preempted and is thus performed to completion. Integrity of operations is defined such that the cryptographic processor 126 provides for opacity of the intermediate data and results. The cryptographic processor 126 serves as the core of the trusted mobile computing device 100 for creating higher-level security services. Such services may include secure storage, trusted execution acceleration of secure or encrypted communication, random number generation, etc.

The cryptographic processor 126 may operate in both a non-protected mode and a protected mode. In a non-protected mode, the cryptographic processor 126 may operate as a non-secure hardware accelerator for encryption and decryption. For example, the cryptographic processor 126 may receive a request to perform a bulk encryption operation for an application executing on the application processor 106. In a protected mode, the cryptographic processor 126 may perform a number of different secure atomic operations. A more detailed description of these operations is set forth below.

Figure 3:
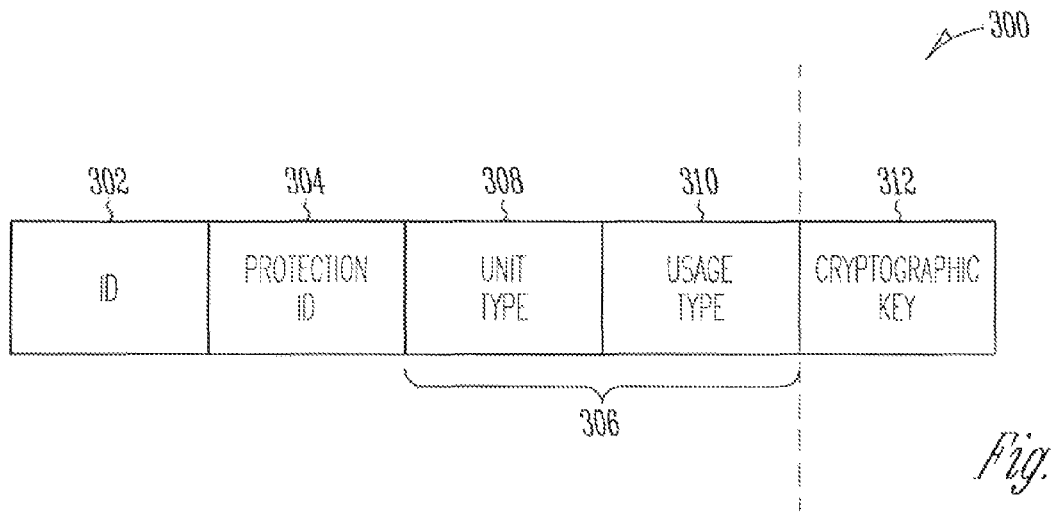
FIG. 3 illustrates one embodiment of an entry in a key cache in a cryptographic processor within a trusted mobile computing device, according to one embodiment of the invention.

FIG. 3 illustrates one embodiment of an entry in a key cache in a cryptographic processor within a trusted mobile computing device, according to one embodiment of the invention. In particular, FIG. 3 illustrates one embodiment of an entry in the key cache 221 of the volatile memory 220. The key cache 221 may include one to a number of entries that include a protected cryptographic key 312 and a header 300. The header provides a number of different identifications as well as restrictions on the usage of the key.

As shown, the header 300 includes an identification 302, a protection identification 304 and a number of flags 306. The number of flags 306 include a unit type 308 and a usage type 310. The identification 302 may be an alphanumeric value that identifies the protected cryptographic key 312. The different functional units and/or the controller 206 in the cryptographic processor 126 may use the identification 302 to access the protected cryptographic key 312. The protection identification 304 may be an alphanumeric value that identifies the key encryption key used to encrypt this protected cryptographic key 312. If the protected cryptographic key 312 is a data encryption key, the protection identification 304 may be the identification for one of the key encryption keys. If the protected cryptographic key 312 is a key encryption key, the protection identification 304 may be the root encryption key 241.

The unit type 308 identifies one or more of the functional units in the cryptographic processor 126 that may access the protected cryptographic key 312. Accordingly, if a primitive instruction causes the generation of microcode instructions that attempt to have a functional unit access a given protected cryptographic key 312 that is not identified by the unit type 308, the access is denied and the cryptographic processor 126 may return an error to the application requesting such execution. The usage type 310 identifies one or more types of operation that may be performed using the protected cryptographic key 312. The type of operations may include signing, encrypted storage, Attestation Identity Key (AIK) operations, etc.

Trusted and Cryptographic Operations

Figure 4:
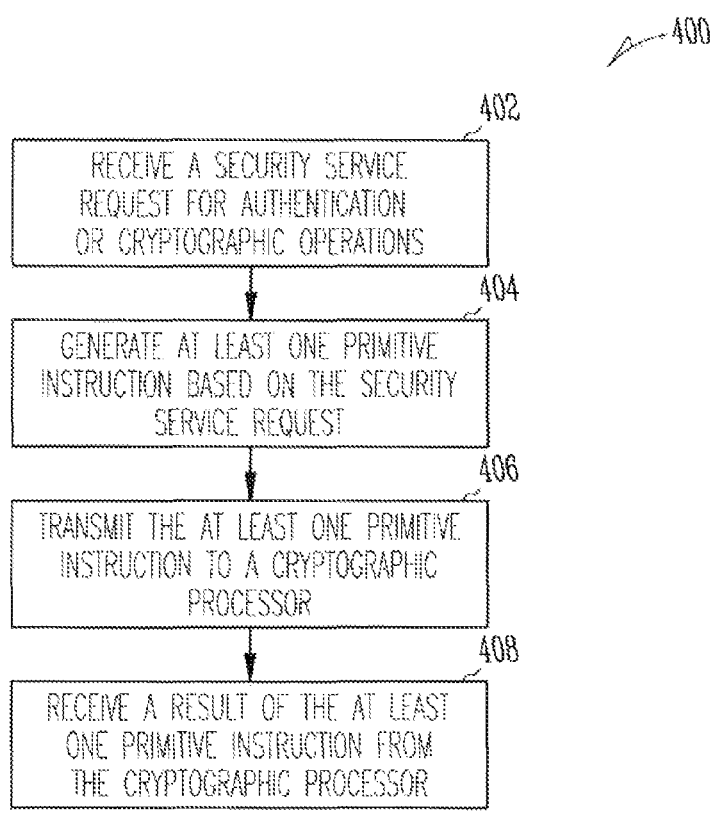
FIG. 4 illustrates a flow diagram for the operations for interfacing with a cryptographic processor, according to one embodiment of the invention.

A more detailed description of trusted and cryptographic operations is now described. FIG. 4 illustrates a flow diagram for the operations for interfacing with a cryptographic processor, according to one embodiment of the invention. In particular, FIG. 4 illustrates a flow diagram 400 for the operations of a driver (for the cryptographic processor 126) executing on the application processor 106 for interfacing with the cryptographic processor 126.

In block 402, a security service request for a trusted or cryptographic operation is received. With reference to the embodiment of FIG. 1, a driver executing on the application processor 106 receives the security service request for a trusted or cryptographic operation. For example, this driver may receive this security service request from the operating system or other applications executing on the application processor 106. The security service request may be a trust operation for authenticating an application, hardware, configuration information, etc. The security service request may be for a cryptographic operation (such as hashing, key generation, encryption, decryption, etc.). Control continues at block 404.

In block 404, at least one primitive instruction is generated based on the security service request. With reference to the embodiment of FIG. 1, the driver for the cryptographic processor 126 generates at least one primitive instruction based on the security service request. For example, the security service request may include one to a number of different cryptographic operations. Accordingly, the driver may generate primitive instructions for the different operations. Control continues at block 406.

In block 406, the primitive instruction(s) are transmitted to the cryptographic processor. With reference to the embodiment of FIG. 1, the driver for the cryptographic processor 126 transmits the primitive instruction(s) to the cryptographic processor 126. The driver makes this transmission through the DMA logic 124. Control continues at block 408.

In block 408, a result of the primitive instruction(s) is received from the cryptographic processor. With reference to the embodiment of FIG. 1, the cryptographic processor 126 transmits a result of the primitive instruction(s) back to the driver for the cryptographic processor 126 through the output buffers 216 (using the DMA interface 202). For example, if the primitive instruction relates to a trust operation for authentication of a given application, the result may be a Boolean value indicative as to whether the application is authenticate. In another example, if the primitive instruction is a request for a decryption operation, the result may be a Boolean value indicative as to whether the decryption operation is successful and where the results of such decryption is stored or the results of such decryption. In a different example, if the primitive instruction is a request for a random number, the result may include the random number. The operations of the flow diagram 400 are complete.

Figure 5:
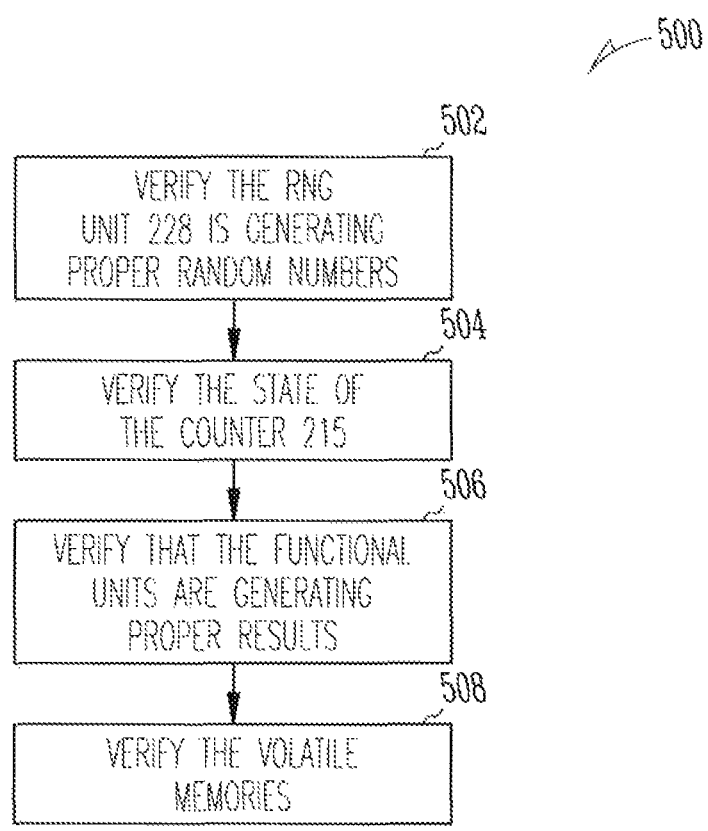
FIG. 5 illustrates a flow diagram for initialization of a cryptographic processor, according to one embodiment of the invention.

A more detailed description of the processing of a primitive instruction by the cryptographic processor 126 is now described. FIG. 5 illustrates a flow diagram for initialization of a cryptographic processor, according to one embodiment of the invention. In particular, in an embodiment, the flow diagram 500 illustrates those operations to be performed prior to execution of operations within the cryptographic processor 126. After successful execution of the operations of the flow diagram 500, the cryptographic processor 126 is within a trusted state.

In block 502, verification is performed to ensure that the RNG unit 228 is generating proper random numbers. With reference to the embodiment of FIG. 2, the controller 206 performs this verification. Such verification may include a series of requests to the RNG unit 228 for random numbers. The controller 206 may verify that the different random numbers output there from are different and are of random values using, for example, tests specified from FIPS 140 for randomness. Control continues at block 504.

In block 504, verification is performed to ensure that the counter is in a proper state. The counter may be a monotonic counter that is a software or hardware counter that counts in only one direction, for example up. The counter may be used in transactions and in authentication protocols to ensure messages are replayed or used more than once. With reference to the embodiment of FIG. 2, the controller 206 performs this verification of the counter 215. The value of the counter 215 may be stored in an encrypted state file in the nonvolatile memory 116. Therefore, such verification may include reading an encrypted state file from the nonvolatile memory 116 to ensure this value of the counter 215 has not been decremented and an arithmetic check to ensure this value of the counter 215 is not at its upper range. Control continues at block 506.

In block 506, verification is performed to ensure that the functional units are generating proper results. With reference to the embodiment of FIG. 2, the controller 206 performs this verification. Such verification may include execution of different operations in the different functional units and verification of the output of such operations. For example, the controller 206 may instruct the DES unit 224 to perform a series of encryptions on different data. The controller 206 may then instruction the DES unit 224 to decrypt these data. The controller 206 may instruct the ALU 222 to compare the data prior to these operations with data subsequent to such operations. Other types of verifications of the functional units may be performed. For example, a functional unit may receive a standard test input and the output there from may be compared to publicly published values from a given standard, such as a Federal Information Processing Standard (FIPS) set forth by the National Institute of Standards and Technology (NIST). Control continues at block 508.

In block 508, verification is performed of the volatile memories. With reference to the embodiment of FIG. 2, the controller 206 may verify the volatile memory 120 and/or the volatile memory 220. Such verification may include a determination that the volatile memories do not include data stored therein. Another verification may include a toggling of the bits therein to verify that that data may be stored properly therein. The operations of the flow diagram 500 are complete.

Figure 6A:
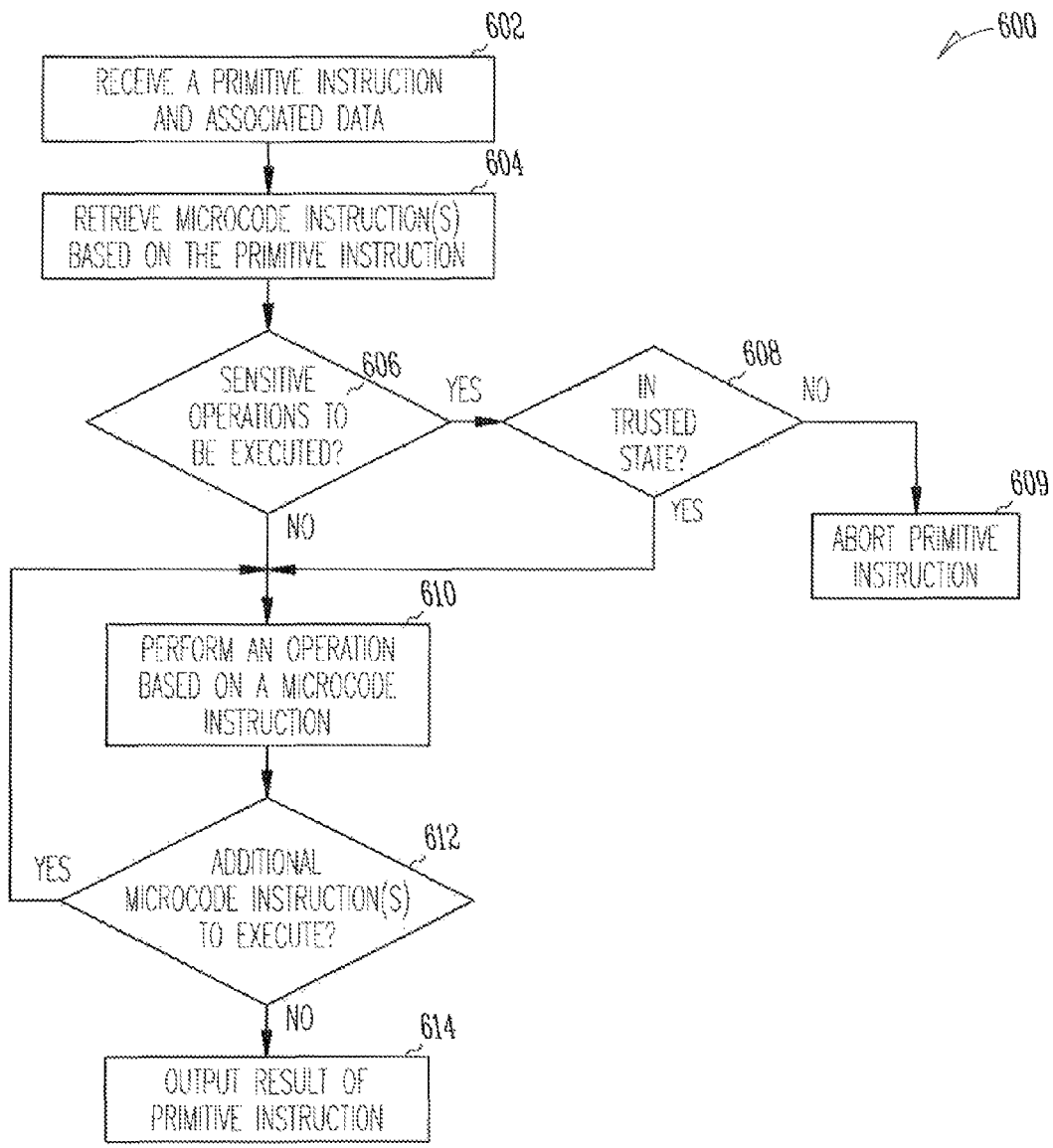
FIG. 6A illustrates a flow diagram for secured operations within a cryptographic processor, according to one embodiment of the invention.

FIG. 6A illustrates a flow diagram for secured operations within a cryptographic processor, according to one embodiment of the invention.

In block 602 of the flow diagram 600, a primitive instruction and/or the associated data are received. With reference to the embodiment of FIG. 1, the cryptographic processor 126 receives a primitive instruction from the driver for the cryptographic processor 126 (executing on the application processor 106). As described above, such primitive instructions may be for different types of secured operations, such as a trust operation, cryptographic operation, etc. With reference to the embodiment of FIG. 2, the cryptographic processor 126 receives the primitive instruction through the DMA interface 202 and stores such instruction into the instruction sequence buffer 204.

Additionally, the cryptographic processor 126 may receive associated data for the primitive instruction for a number of such instructions. With reference to the embodiment of FIG. 2, the cryptographic processor 126 receives the associated data through the DMA interface 202 into the input buffers 218. For example, if the primitive instructions relates to a trust operation to authenticate an application (e.g., the operating system for the application processor 106) to be executed in the application processor 106, the associated data is the code for the application that is retrieved from the nonvolatile memory 116.

To further illustrate, the cryptographic processor 126 may be used to encrypt data that is confidential or needed to be protected from modification. Accordingly, such operations can be used by the trusted mobile computing device 100 to protect files from being modified or viewed by other applications or uses of the trusted mobile computing device 100. Moreover, the cryptographic processor 126 may be used in a trusted mobile computing device 100 that is part of the Digital Rights movement to protect content and digital rights (permissions) objects. Therefore, the cryptographic processor 126 may be used to decrypt a Moving Picture Expert Group (MPEG) Audio Layer 3 (MP3) file that has been digitally protected in accordance with the Digital Rights movement.

Another example of such data may include data for a bulk decryption operation, wherein the data is received into the trusted mobile computing device 100 from a remote device (such as a different mobile device, server, etc.). The associated data may include the data to be decrypted along with the public key that is used to perform the decryption operation.

The cryptographic processor 126 may receive the associated data for the primitive instruction through a public interface of the nonvolatile memory 116 and/or the volatile memory 120. Returning to the flow diagram 600, control continues at block 604.

In block 604, the microcode instruction(s) for the primitive instruction are retrieved. With reference to the embodiment of FIG. 2, the controller 206 retrieves the microcode instruction(s) for the primitive instruction from the microcode memory 240. A given primitive instruction may include one to a number of different microcode instructions. For example, if the primitive instruction is to authenticate an application based on a comparison of a signed credential of the application to a cryptographic hash, the microcode instructions may include an instruction to retrieve the signed credential from the nonvolatile memory 116. Another microcode instruction may include the retrieval of an encryption key from the nonvolatile memory 116 that is used for cryptographic hash. Another microcode instruction may include a move operation of the encryption key to the SHA unit 230, while a different microcode instruction may instruct the SHA unit 230 to perform the cryptographic hash. Another microcode instruction may include a move operation of the result of the cryptographic hash and the signed credential to the ALU 22, while a different microcode instruction may instruct the ALU 222 to perform a comparison of these two values. Another microcode instruction may cause the result of the comparison operation to be stored into the output buffers 216 (which is transmitted back to the application processor 106).

As described, a given primitive instruction may include a series of microcode instructions. Accordingly, the intermediate results for a given primitive instruction are opaque to components that are external to the cryptographic processor 126. Returning to the flow diagram 600, control continues at block 606.

In block 606, a determination is made as to whether sensitive operation(s) are performed within the cryptographic processor based on the microcode instruction(s) for this primitive instruction. With reference to the embodiment of FIG. 2, the controller 206 makes this determination. Examples of sensitive operation(s) may include any operation that uses the root encryption key 241, that uses any of the protected keys (in the key cache 221) and/or that accesses the counter 215 or any of the platform configuration registers 210. After determining that sensitive operation(s) are not performed within the cryptographic processor 126 based on the microcode instruction(s) for this primitive instruction, control continues at block 610, which is described in more detail below.

In block 608, after determining that sensitive operation(s) are performed within the cryptographic processor 126 based on the microcode instruction(s) for this primitive instruction, a determination is made as to whether the cryptographic processor is in a trusted state. With reference to the embodiment of FIG. 2, the controller 206 makes this determination. In an embodiment, the cryptographic processor 126 may not be in a trusted state if the cryptographic processor 126 is not properly initialized (as described above in conjunction with the flow diagram 400 of FIG. 4). The cryptographic processor 126 may not be in a trusted state if an illegal operation had been performed. An example of an illegal operation may be when data is attempted to be improperly moved from one location to a second location (as described herein with regard to the restrictions of data movement). The cryptographic processor 126 may also not be in a trusted state if authentication fails, or if a key is not properly loaded into a cryptographic unit, or if parameters associated with a primitive instruction 502 are not within the proper range, etc. Authentication is used during loading keys, and consists of an HMAC-SHA calculation using a password and two random numbers, one random generated by the cryptographic processor 126 and the other generated by the application or user. The HMAC calculation may also include values from the primitive instruction 502 or attributes of the key to be loaded.

In some embodiments, an application that wishes to load a cryptographic key into one of the functional units of the cryptographic processor 126 for execution calculates the HMAC using the password for the key. The application may have prior knowledge of the password. For example, when the key was created, the application may set the password. The application may provide the expected result of the HMAC calculation as a parameter for the primitive instruction 502. The cryptographic processor 126 also generates the HMAC calculation and compares its result to the expected result parameter on the primitive instruction 502. If the two results match, then authentication is successful and the key is loaded. If the results do not match, then authentication fails and the key is not loaded.

In block 609, the primitive instruction is aborted. With reference to the embodiment of FIG. 2, the controller 206 aborts this primitive instruction. The controller 206 terminates any additional microcode instructions and may also send a fail notification to the driver executing on the application processor 106. The operations of the flow diagram 600 are then complete.

In block 610, after determining that the cryptographic processor 126 is in a trusted state, an operation associated with the primitive instruction is performed. With reference to the embodiment of FIG. 2, the controller 206 controls the order of execution of the different operations based on the microcode operations. Therefore, the controller 206 may transmit a control instruction for execution to the appropriate functional unit within the cryptographic processor 126, the nonvolatile memory controller 114 or the volatile memory controller 118. The appropriate functional unit within the cryptographic processor 126, the nonvolatile memory controller 114 or the volatile memory controller 118 performs the operation. With regard to accessing the nonvolatile memory 116 and the volatile memory 120 during execution of the primitive instruction, the cryptographic processor 126 may perform such access through the private interface for the nonvolatile memory 116 and the volatile memory 120. For example, assume that an encrypted data encrypted key, which is stored in the volatile memory 120, is to be used for a cryptographic operation for a primitive instruction. The controller 206 may retrieve this encrypted data encryption key through the private interface for the volatile memory 120. Additionally, other examples of operations associated with the primitive instruction are illustrated in the description for the block 604 (set forth above).

The controller 206 may move data among the different functional units. However, the cryptographic processor 126 may be configured with one or more data moving restrictions. Such restrictions ensure that a rogue process cannot surreptitiously read any sensitive information out from the cryptographic processor 126. Such restrictions may be stored in the microcode memory 240. For example, one data restriction precludes data stored in the key storage 220 from being written to the output buffers 216. Such a restriction prevents an encryption key from being read out from the cryptographic processor 126 in an unencrypted format.

Another example restriction may preclude data stored in the input buffers 218 from being written to the context storage/PCRs 210. Such a restriction prevents an overwrite of the platform configuration for the cryptographic processor 126. Another example restriction may preclude data stored in the input buffers 218 from being written to the key cache 221. Such a restriction prevents an overwrite of the encryption keys stored therein. Returning to the flow diagram 600, control continues at block 612.

In block 612, a determination is made as to whether additional microcode instructions are to be executed. With reference to the embodiment of FIG. 2, the controller 206 makes this determination. As described above, the controller 206 retrieves one to a number of microcode instructions for a given primitive instruction from the microcode memory 240. Therefore, the controller 206 determines whether these different instructions have been executed. After determining that additional microcode instructions are to be executed for a given primitive instruction, control continues at block 606, wherein a different microcode instruction is executed. After determining that additional microcode instructions are not to be executed for a given primitive instruction, the microcode executes clean-up operations to ensure the crypto processor 126 stays in a trusted state. Clean-up operations include things such as removing keys from crypto units that were used during the operation, overwriting intermediate results in intermediate storage 214 with zeros or ones, resetting state flags in the crypto processor to indicate an operation is complete or keys are no longer available, etc. After clean-up operation are finished, the operations of the flow diagram 600 are complete.

The operations of the flow diagrams 300 and 600 may be used for a number of different trusted and cryptographic operations. One such example involves the write access to the nonvolatile memory 116. The nonvolatile memory 116 may be divided into a number of different blocks. For example, if the size of the nonvolatile memory 116 is eight megabytes, the nonvolatile memory 116 may include eight one-megabyte blocks. The number of different blocks may have an associated enable to control write access thereto. The cryptographic processor 126 may allow for the assertion of the enable for a given block after the data to be stored therein has been authenticated. Accordingly, the driver for the cryptographic processor 126 receives a security service request for a write access to a given block in the nonvolatile memory 116. The driver then generates a primitive instruction that requests authentication of the data to be stored in the block. The primitive instruction along with a signed credential and the data are transmitted to the cryptographic processor 126. The cryptographic processor 126 may then execute a number of different microcode instructions to generate a cryptographic hash across the data that is compared to the signed credential. The cryptographic processor 126 may authenticate the data based on the comparison. Such an example may be used for authenticating a new patch for a given application that is downloaded into trusted mobile computing device 100.

Accordingly, as described, embodiments of the invention may perform both trusted operations and cryptographic operations within a same processor that is within an executable context that is independent of the executable context for the application processor within a trusted mobile computing device. Therefore, this cryptographic processor may be used to perform trust operations (such as trusted boot operations to authenticate the operating system for the application processor), while also using the same functional units to perform different types of cryptographic operations subsequent to the trusted boot operations.

Moreover, as described, the cryptographic processor 126 may ensure that the trust-related encryption keys are not exposed (unencrypted) externally. The cryptographic processor 126 may ensure that intermediate, partial results of cryptographic operations are also not exposed externally. Further, the cryptographic processor 126 may ensure that once initiated, a cryptographic operation is not modified or tampered with from components external thereto.

Figure 6B:
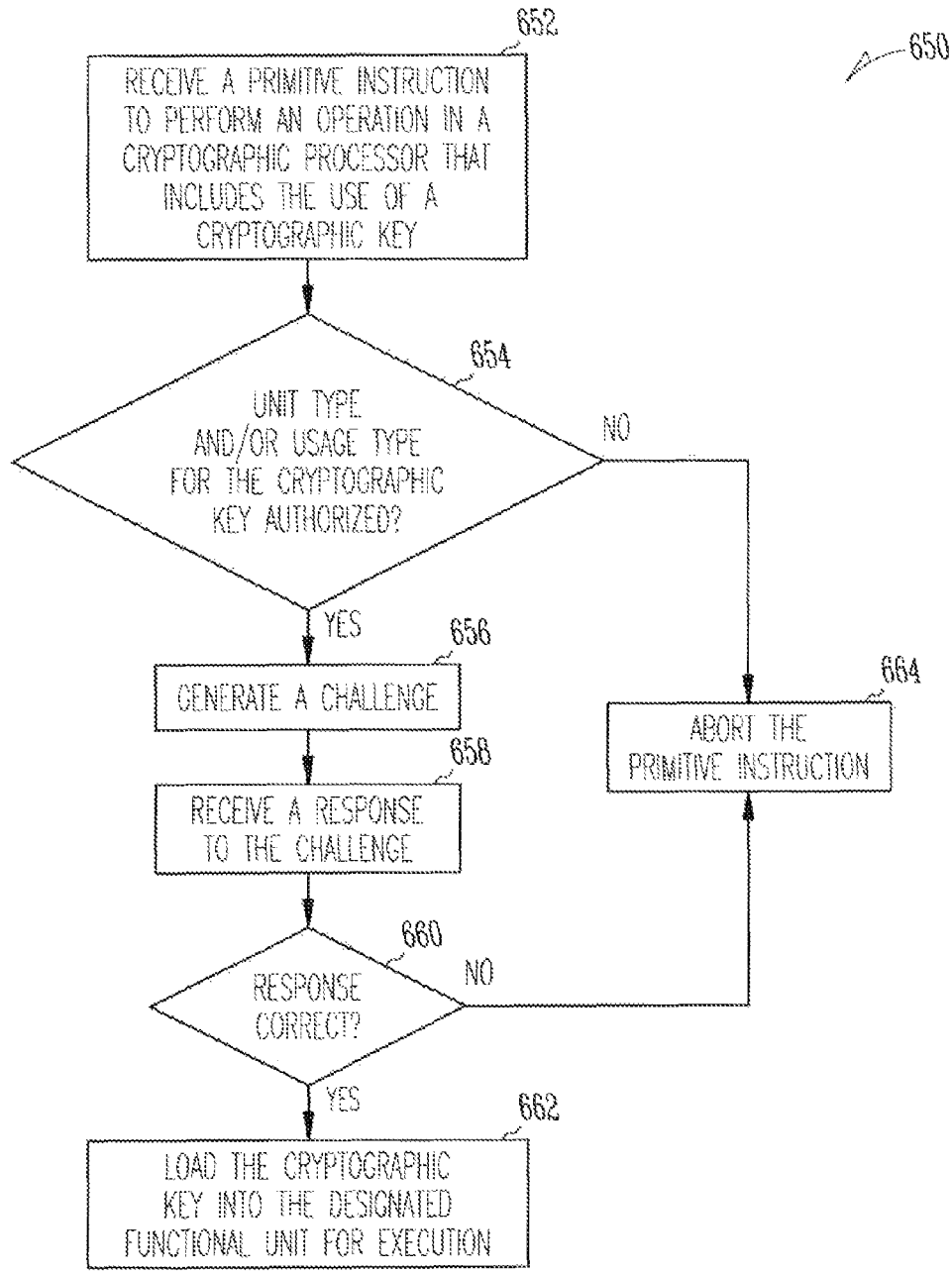
FIG. 6B illustrates a flow diagram for execution of a cryptographic operation using a cryptographic key within a cryptographic processor, according to one embodiment of the invention.

A more detailed description of the execution of a cryptographic operation that includes the use of a cryptographic key is now described. In particular, FIG. 6B illustrates a flow diagram for execution of a cryptographic operation using a cryptographic key within a cryptographic processor, according to one embodiment of the invention. The flow diagram 650 illustrates validation and authentication operations for the cryptographic key prior to its use in the execution of an operation in the cryptographic processor 126.

In block 652, a primitive instruction is received to perform an operation in a cryptographic processor that includes the use of a cryptographic key. With reference to the embodiment of FIG. 2, the controller 206 may receive this primitive instruction. The cryptographic key may be generated external to the cryptographic processor 126. Such a cryptographic key may have already been loaded into a memory within the cryptographic processor 126 prior to receipt of the primitive instruction. Alternatively, the cryptographic key may be loaded into the cryptographic processor 126 in conjunction with the primitive instruction. The cryptographic key may be internally generated by the functional units in the cryptographic processor 126. The cryptographic key may be encrypted by a protection encryption key. Additionally, unit types and/or usage types for the cryptographic key (which are described in more detail above in conjunction with FIG. 3) may be associated with the cryptographic key. Control continues at block 654.

In block 654, a determination is made as to whether the unit type and/or the usage type for the cryptographic key is authorized. With reference to the embodiment of FIG. 2, the controller 206 may make this determination. Returning to FIG. 3 to help illustrate, the controller 206 may retrieve the header 300 for the cryptographic key. The controller 206 may determine whether the functional unit that is to use the cryptographic key is listed as one of the unit types 308. Additionally, the controller 206 may determine whether the operation to be performed using the cryptographic key is listed as one of the usage types 310. After determining that the unit type and/or the usage type for the cryptographic key is not authorized, control continues at block 664, which is described in more detail below.

In block 656, after determining that the unit type and/or the usage type for the cryptographic key is authorized, a challenge is generated. With reference to the embodiment of FIG. 2, the controller 206 causes the generation of a challenge. A cryptographic key that is loaded into the cryptographic processor 126 may include an associated password. The associated password is known within the cryptographic processor 126 and by the application issuing the primitive instruction. The controller 206 may generate a challenge that is output back to the application executing on the application processor 106. The challenge may request a response from the application for a hash of the associated password. While the hash of the password may be a number of different types, in one embodiment, the hash is based on an HMAC operation. Control continues at block 658.

In block 658, a response to the challenge is received. With reference to the embodiment of FIG. 1, the application (requesting execution of the primitive instruction) executing on the application processor 106 transmits the response back to the cryptographic processor 126. The controller 206 receives the response to the challenge. Control continues at block 660.

In block 660, a determination is made as to whether the response is correct. With reference to the embodiment of FIG. 2, the controller 206 instructs the SHA unit 230 to generate the hash of the password. For example, the SHA unit 230 may generate the hash based on an HMAC operation. The controller 206 may instruct the ALU 222 to compare the hash received from the application to the hash generated by the SHA unit 230. If the hashes are equal, the response is considered correct. After determining that the response is not correct, control continues at block 664, which is described in more detail below.

In block 662, after determining that the response is correct, the cryptographic key is loaded into the designated functional unit for execution. With reference to the embodiment of FIG.

2, the controller 206 causes the cryptographic key to be loaded into the designated functional unit for execution. This functional unit may then execute the instruction (as described above in the flow diagram 600). The operations of the flow diagram 650 are then complete.

In block 664, the primitive instruction is aborted. With reference to the embodiment of FIG. 2, the controller 206 aborts this primitive instruction. The controller 206 terminates any additional microcode instructions and may also send a fail notification to the driver executing on the application processor 106. The operations of the flow diagram 650 are then complete.

The flow diagram 650 illustrates one example of a challenge/response for authorization for use of a cryptographic key in the cryptographic processor 126. In particular, the flow diagram 650 illustrates a challenge/response using a hash of a password associated with the cryptographic key. Embodiments of the invention may use other types of challenge/response operations for authorization.

Figure 7:
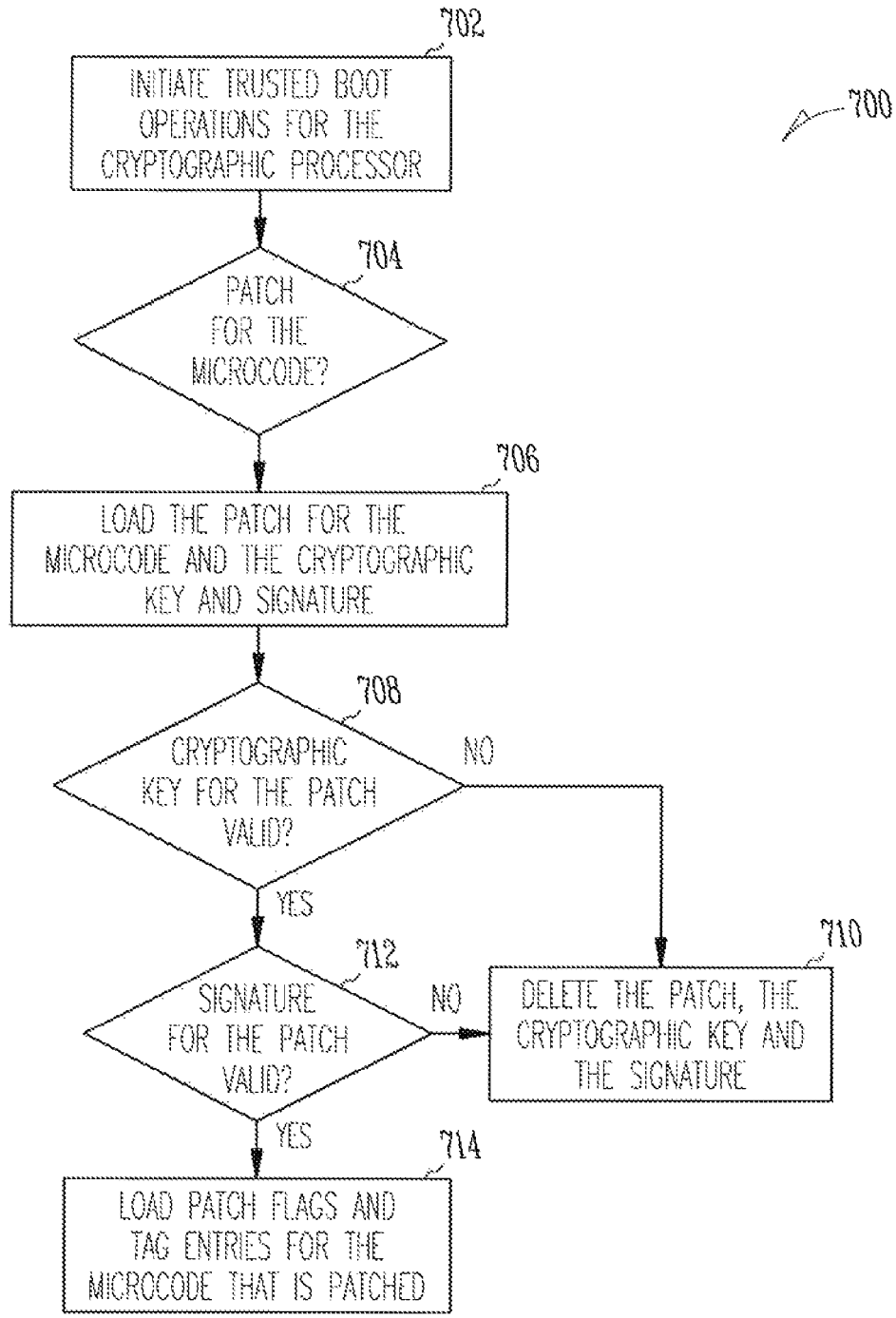
FIG. 7 illustrates a flow diagram for updating of microcode within a cryptographic processor, according to one embodiment of the invention.

The microcode instructions stored in the microcode memory 240 may be patched or updated. However, if the microcode memory 240 is a read only memory, the patch may be stored in the volatile memory 220 such that the instructions within the patch are used in place of those in the microcode memory 240. In order to maintain the security and trustworthy state for the cryptographic processor 126, such patches/updates may be authenticated prior to installation. One embodiment for such an update to these microcode instructions is now described. In particular, FIG. 7 illustrates a flow diagram for updating of microcode within a cryptographic processor, according to one embodiment of the invention.

In block 702, trusted boot operations are initiated for the cryptographic processor. With reference to the embodiment of FIG. 1, the cryptographic processor 126 is booted based on instructions stored in the trusted boot ROM 108. As part of the trusted boot operations, the instructions in the microcode memory 240 may be patched (which is described in more detail in the flow diagram 700). A more detailed description of the trusted boot operations is described in the following co-pending, commonly assigned U.S. patent application entitled "Securing an Electronic Device", Ser. No. 10/745,469 filed on Dec. 22, 2003. Control continues at block 704.

In block 704, (as part of the trusted boot operations) a determination is made as to whether there is a patch for the microcode. With reference to the embodiment of FIG. 2, the nonvolatile memory 116 includes a segment designated for storage of patches to the microcode instructions. Accordingly, the controller 206 may determine whether there is patch for the microcode based on whether data in the designated segment includes the patch. After determining that there is not a patch, the operations of the flow diagram 700 are complete.

In block 706, after determining that there is a patch for the microcode, the patch as well as the cryptographic key and signature for the patch is loaded. With reference to the embodiment of FIG. 2, the controller 206 loads the patch, the cryptographic key and the signature for the patch into the volatile memory 120. Control continues at block 708.

In block 708, a determination is made as to whether the cryptographic key for the patch is valid. With reference to the embodiment of FIG. 2, the nonvolatile memory 116 may include a segment that is defined as "one time programmable". In particular, this segment may be written to a single time, thereby precluding a rogue or malicious process from modifying the data stored in this segment. This segment may include a hash of the cryptographic key for the patch. Therefore, the controller 206 may retrieve this hash and the cryptographic key from the nonvolatile memory 116 and the volatile memory 120, respectively. The controller 206 may instruct the SHA unit 230 to generate a hash of the cryptographic key. The controller 206 may then instruct the ALU 222 to compare this hash result and the hash retrieved from the nonvolatile memory 116 to determine if these two values are the same. If these two values are equal, the cryptographic key for the patch is valid.

In block 710, after determining that the cryptographic key for the patch is not valid, the patch, the cryptographic key and the signature for the patch are deleted. With reference to the embodiment of FIG. 2, the controller 206 deletes the patch, the cryptographic key and the signature for the patch from the volatile memory 120. Accordingly, the instructions within the patch will not be loaded into or executed by the cryptographic processor 126. The operations of the flow diagram 700 are then complete.

In block 712, after determining that the cryptographic key for the patch is valid, a determination is made as to whether the signature for the patch is valid. With reference to the embodiment of FIG. 2, the controller 206 loads the patch into the SHA unit 230. The controller 206 then instructs the SHA unit 230 to generate a digest of the patch. The controller 206 loads the digital signature that accompanies the patch into the exponential arithmetic unit 234 along with the cryptographic key. The controller 206 may then instruct the exponential arithmetic unit 234 to decrypt the signature. The controller 206 may examine the output of the exponential arithmetic unit 234 to determine if the signature decrypted properly. After proper decryption of the signature, the controller 206 instructs the ALU 222 to compare the decrypted signature with the digest generated by the SHA unit 230. If the two values are equal, then the signature for the patch is valid and the patch is a properly authorized patch for the cryptographic processor 126.

In block 714, after determining that the signature for the patch is valid, the patch flags and tag entries for the microcode that is patched is loaded. With reference to the embodiment of FIG. 2, in addition to the instructions that are part of the patch, the patch may include a set of patch flags that indicate which of the segments of the microcode memory 240 are patched. The controller 206 may load these patch flags into the patch flag memory 281. Such patch flags may be a one-bit representation for each segment in the microcode memory 240. A set bit in the patch flag memory 281 indicates that the corresponding segment in the microcode memory 240 has a patch. For example, if bit five is set in the patch flag memory 240, then segment five in the microcode memory 240 has a corresponding patch. Accordingly, the file that includes the patch may include the patch flags, a series of patch segments preceded by a patch tag and a digital signature over the patch flags and the series of patch segments and patch tags. A given patch tag for a segment in the microcode memory 240 stores the identification of the segment in the patch that is to be executed in place of the segment in the microcode memory 240. Accordingly, during execution of instructions in a segment of the microcode memory 240, if the flag indicates that this segment is patched, the controller 206 fetches the instructions from the patch (using the tag entry) for execution in place of the instructions from the microcode memory 240. In some embodiments, the segments of the patch are only loaded from the volatile memory 120 to the volatile memory 220 when instructions therein are to be executed. Moreover, this segment may remain in the volatile memory 220. Accordingly, if the instructions therein are to be reexecuted, the controller 206 does not have to refetch this segment from the volatile memory 120. The operations of the flow diagram 700 are complete.

Therefore, as described, the microcode within the cryptographic processor 126 may only be patched based on an authentication operation that includes a cryptographic key that is validated based on a hash that is stored in a "one time programmable" storage. The authentication operation is also validated based on a signature across the patch using the validated cryptographic key.

System Operating Environment

In this section, a system overview is presented. The system overview presents a network configuration used in conjunction with embodiments of the invention. The system overview also presents the general functionality of the network configuration.

Figure 8:
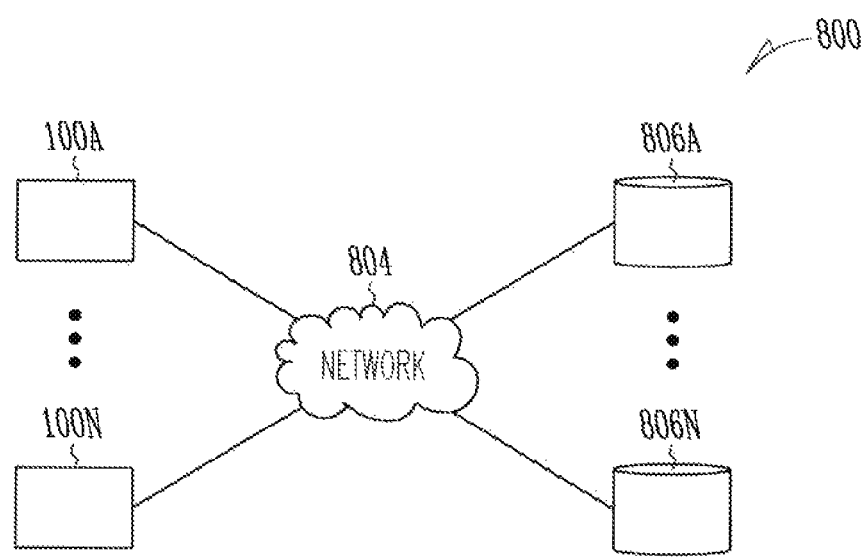
FIG. 8 illustrates a simplified functional block diagram of a system configuration wherein a trusted mobile communications device having cryptographic operations may operate, according to one embodiment of the invention.

FIG. 8 illustrates a simplified functional block diagram of a system configuration wherein a trusted mobile communications device having cryptographic operations may operate, according to one embodiment of the invention. FIG. 8 illustrates a system 800 that includes a number of the trusted mobile computing devices 100A-100N and a number of servers 806A-806N that are coupled together through a network 804. The network 804 may be a wide area network, a local area network or a combination of different networks that provide communication between the number of trusted mobile computing devices 100A-100N and the number of servers 806A-806N. For example, the number of trusted mobile computing devices 100A-100N may be different types of wireless computing devices, wherein a part of the network 804 is configured to process wireless communications, while a different part of the network 804 may be configured to process wired communications for communications with the number of servers 806A-806N.

The number of trusted mobile computing devices 100A-100N may perform a number of different trust and cryptographic operations as described above. For example, users of the number of trusted mobile computing devices 100A-100N may perform different electronic commerce transactions with different applications executing on the number of servers 806A-806N.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or nonvolatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for a trusted mobile platform architecture, in accordance with embodiments of the invention. A number of figures show flow diagrams illustrating operations for a trusted mobile platform architecture, in accordance with embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. To illustrate, while described with reference to trust and encryption operations while the trusted mobile computing device 100 is in actual operation by a user of such device, embodiments of the invention are not so limited. For example, the cryptographic processor 126 may be used to authenticate a device during a debug operation of the trusted mobile computing device 100. Returning to FIG. 1 to illustrate, a device may be coupled to the cryptographic processor 126 through the JTAG interface 155 for debugging. Accordingly, the cryptographic processor 126 may authenticate this device through a challenge/response operation. The cryptographic processor 126 may generate a challenge that is transmitted to the device coupled to the JTAG interface 155. Such device then generates a response to the challenge. Therefore, if the cryptographic processor 126 authenticates this device based on the response, the device is able to perform communications with the trusted mobile computing device 100 through the JTAG interface 155.

To further illustrate a permutation of embodiments of the invention, while described such that primitive instructions are executed serially within the cryptographic processor 126, in an embodiment, a number of different microcode operations for different primitive instructions may be executing at least simultaneously in part therein. What is claimed as the invention, therefore, is all such modifications as may come within the scope and available equivalents of the following claims and equivalents thereto. Therefore, the specification and drawings are to be regarded in an illustrative rather than a restrictive sense.

What is claimed is:

1. An apparatus comprising:
a system-on-a-chip including:
an application processor to execute a driver, the driver to generate a primitive instruction in response to a request for a security service;
direct memory access logic; and
a cryptographic processor comprising:
at least one cryptographic unit;
an interface to receive the primitive instruction from the application processor through the direct memory access logic;
an instruction buffer to store the primitive instruction received by the interface;
a nonvolatile memory to store a plurality of microcode instructions, wherein one or more of the plurality of microcode operations is to cause the cryptographic processor to perform one or more of a plurality of operations including one or more sensitive operations; and
a controller to retrieve the primitive instruction from the instruction buffer and one or more microcode instructions for the primitive instruction from the nonvolatile memory, determine whether at least one of the one or more microcode instructions is to cause the cryptographic processor to perform a sensitive operation, determine whether the cryptographic processor is within a trusted state based on whether the cryptographic processor is properly initialized, control execution of the at least one microcode instruction by the at least one cryptographic unit if the cryptographic processor is in the trusted state or if the at least one microcode instruction is to cause the cryptographic processor to perform a sensitive operation, and preclude execution of the at least one microcode instruction when the cryptographic processor is in an untrusted state and the at least one microcode instruction is to cause the cryptographic processor to perform a sensitive operation.

2. The apparatus of claim 1, wherein the system-on-a-chip also includes:
a volatile memory to store a cache of at least one cryptographic key and a counter, and
at least one platform configuration register.

3. The apparatus of claim 2, wherein a sensitive operation is an operation that uses a root encryption key for the apparatus, an operation that uses one of the at least one cryptographic key, or an operation that is to access the counter or the at least one platform configuration register.

4. The apparatus of claim 1, wherein an illegal operation includes an out-of-order execution by one of the at least one cryptographic units.

5. The apparatus of claim 1, wherein determining that the at least one microcode instruction is to cause the cryptographic processor to perform the sensitive operation comprises determining that the at least one microcode instruction does not use a root encryption key of the cryptographic processor.

6. The apparatus of claim 1, wherein determining that the at least one microcode instruction is to cause the cryptographic processor to perform the sensitive operation comprises determining that the at least one microcode instruction does not use an encryption key protected within the cryptographic processor.

7. The apparatus of claim 1, wherein determining that the at least one microcode instruction is to cause the cryptographic processor to perform the sensitive operation comprises determining that the at least one microcode instruction does not access a monotonic counter or data in a platform configuration register.

8. The apparatus of claim 1, wherein determining whether the cryptographic processor is within a trusted state based on whether the cryptographic processor is properly initialized further comprises verifying whether at least one functional unit in the cryptographic processor is generating proper results.

9. The apparatus of claim 8, wherein verifying that the at least one functional unit in the cryptographic processor is generating proper results comprises verifying that a hash unit in the cryptographic processor is generating correct hashes.

10. The apparatus of claim 8, wherein verifying that the at least one functional unit in the cryptographic processor is generating proper results comprises verifying that a random number generator unit is generating random numbers.

11. The apparatus of claim 8, wherein verifying that the at least one functional unit in the cryptographic processor is generating proper results comprises verifying that an exponential arithmetic unit or an arithmetic logic unit is computing proper results.

* * * * *